(No Model.)
N. LENNARDS.
MEASURING DEVICE FOR TAILORS, &c.
No. 281,530. Patented July 17, 1883.
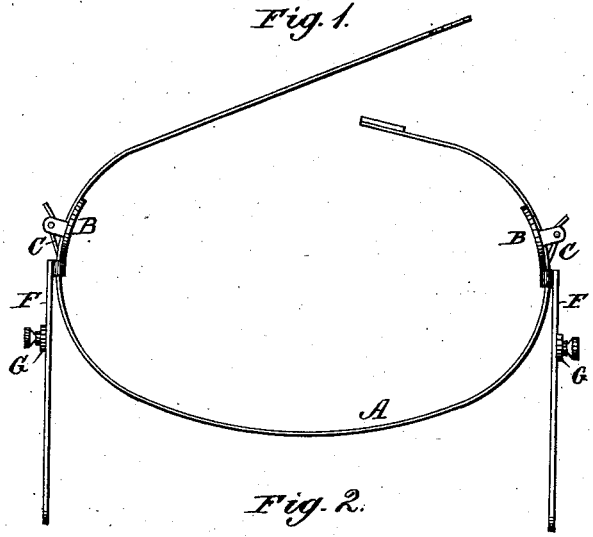
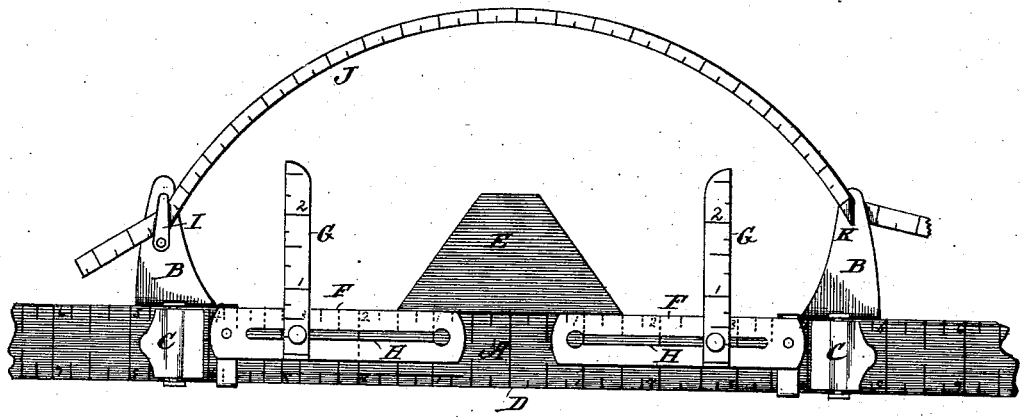
WITNESSES:
INVENTOR:
ATTORNEYS.

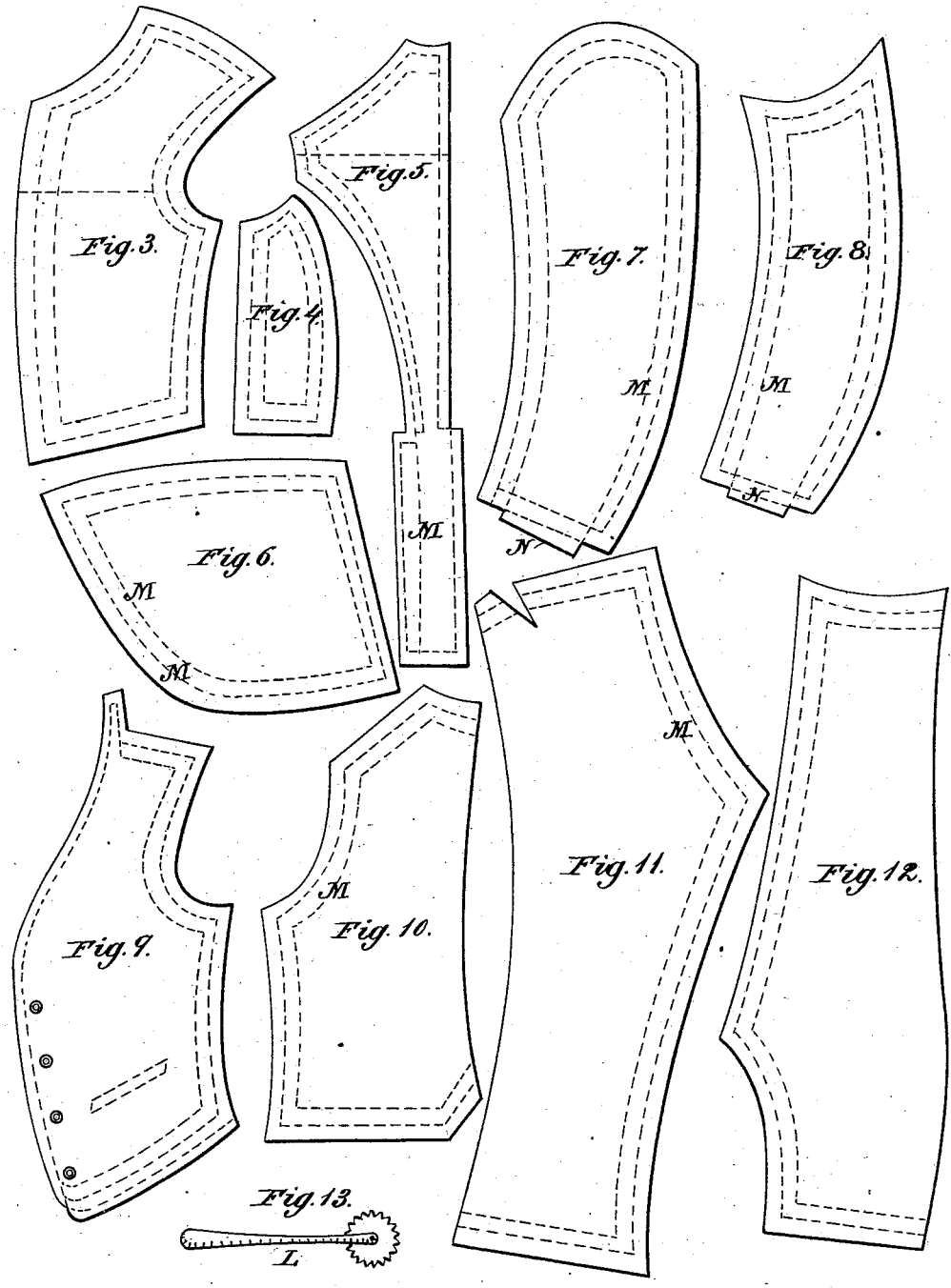

UNITED STATES PATENT OFFICE.

NICHOLAS LENNARDS, OF HARVARD, ILLINOIS.

MEASURING DEVICE FOR TAILORS, &c.

SPECIFICATION forming part of Letters Patent No. 281,530, dated July 17, 1883.

Application filed December 7, 1882. (No model.)

*To all whom it may concern:*

Be it known that I, NICHOLAS LENNARDS, of Harvard, in the county of McHenry and State of Illinois, have invented a new and useful Improvement in Measuring Devices for Tailors, Dress-Makers, and Others, of which the following is a full, clear, and exact description, reference being had to the annexed drawings, forming part of this specification.

My invention relates to an improved device for taking measurements of the human form by which patterns for garments are to be cut, and the object is to secure correctness in fitting under all circumstances.

In the drawings, Figure 1 is a top view of the measuring device. Fig. 2 is a back view of the same, showing the device spread out and broken away at the ends. Figs. 3, 4, 5, and 6 represent a coat-pattern, and Figs. 7 and 8 a sleeve; Figs. 9 and 10, a vest, and Figs. 11 and 12 a trousers pattern, and Fig. 13 a tracer.

A indicates a band or belt, to be made of any suitable material, and provided with a buckle at one end, by which it may be secured around the body. To this band are loosely connected sliding plates B B, which are provided with pivoted clasps C, adapted to secure said plates in any desired position on the band. From a central transverse line, D, a graduated scale is made to extend along one edge to each end of the band, and this scale is to be duplicated on the opposite edge, as shown, in order that the band may be used with either edge up, so that it may be fitted to the body with the nearly triangular plate or pad E, which is secured to one edge of the band, either turned down against the small of the back or up between the shoulders. The object of the plate E is to assist in properly supporting the band. To each of the sliding plates B is secured a steel or brass plate, F, which lies alongside the band A, and this plate F is provided with an upright plate, G, which is secured thereto by a thumb-screw working in a longitudinal slot, H, in the plate F. The two plates F are arranged with their free ends toward each other, and form with the plates G two independent measuring-squares, which come directly under the armpit, respectively. The plates F and G are provided with graduated scales, and, together with the sliding plates B, serve to give the size of the arms and the height of the shoulders from the armpits. They serve also in measuring the width of the back.

I indicates a flat spring secured to one of the sliding plates B, as a means for holding the tape-line J, which is drawn through a slot, K, in the other plate B after being passed around the neck of the person being measured.

In order to facilitate the use of my measuring device, so that it can be easily and successfully used by any tailor or dress-maker, I have devised a pattern-sheet, as shown in Figs. 3 to 12, inclusive, from which any size of pattern desired may be quickly measured off and traced on paper by the tracing-wheel L. This pattern-sheet is provided with a number of lines, M, arranged for the most part parallel with each other, to represent patterns of different sizes. Some of the patterns are provided with projecting parts N, to represent, together with the inner lines, a narrower and longer pattern than the outer lines. The measuring device is to be used as follows: Buckle the band A across the chest close up under the arms, with the triangular plate E turned either down against the small of the back or up between the shoulders. Then adjust the sliding plates B directly in front of the arms and secure them by their clasps, and pass the tape-line up over one shoulder, around the neck, and down in front of the other shoulder through the slot K. The upright plates G should then be adjusted close up against the back part of the arms and secured by the thumb-screws. The measurements to be taken will thus be indicated on the device by means of the graduated scales, and may be noted down without any danger of an error. When the measure has been taken, the pattern is to be traced out from the pattern-sheets in the manner already described.

Having thus described my invention, what I claim as new, and desire to secure by Letters Patent, is—

The combination of the band A, having the triangular plate E secured thereto, the plates B, having the adjustable squares secured thereto, and the tape-line attached to the plates B, substantially as shown and described.

NICHOLAS LENNARDS.

Witnesses:
J. P. CHEEVER,
H. B. MINIER.